US012764075B2

(12) United States Patent
Kubomi et al.

(10) Patent No.: US 12,764,075 B2
(45) Date of Patent: Oct. 13, 2026

(54) COMMUNICATION CONTROL APPARATUS, COMMUNICATION CONTROL METHOD, AND COMPUTER READABLE MEDIUM

(71) Applicant: Mitsubishi Electric Corporation, Tokyo (JP)

(72) Inventors: Makoto Kubomi, Tokyo (JP); Sachiko Taniguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 82 days.

(21) Appl. No.: 18/907,204

(22) Filed: Oct. 4, 2024

(65) Prior Publication Data

US 2025/0030648 A1 Jan. 23, 2025

Related U.S. Application Data

(63) Continuation of application No. PCT/JP2022/020278, filed on May 13, 2022.

(51) Int. Cl.
*H04L 47/70* (2022.01)
*H04L 47/2425* (2022.01)
*H04L 47/80* (2022.01)

(52) U.S. Cl.
CPC ........ *H04L 47/826* (2013.01); *H04L 47/2425* (2013.01); *H04L 47/805* (2013.01)

(58) Field of Classification Search
CPC . H04L 47/826; H04L 47/2425; H04L 47/805; H04L 12/40143; H04L 12/4035
See application file for complete search history.

(56) References Cited

U.S. PATENT DOCUMENTS 5,444,762 A 8/1995 Frey et al.
5,557,656 A 9/1996 Ray et al.
(Continued)

FOREIGN PATENT DOCUMENTS

JP 2017-34678 A 2/2017
JP 2017-532870 A 11/2017
(Continued)

OTHER PUBLICATIONS

Hellmanns et al., "On the Performance of Stream-based, Class-based Time-aware Shaping and Frame Preemption in TSN", 2020 IEEE International Conference on Industrial Technology (ICIT), 2020, pp. 298-303.
(Continued)

*Primary Examiner* — Brian Whipple
(74) *Attorney, Agent, or Firm* — Birch, Stewart, Kolasch & Birch, LLP

(57) ABSTRACT

A schedule policy decision unit (103) determines whether or not a delay is allowed which is estimated to occur when a group allocation method is applied to a communication frame included in a communication stream, wherein the group allocation method is for allocating a time slot for transmitting a communication frame in a unit of group of one or more communication frames having a common attribute, decides, when the delay is allowed, to allocate the time slot to the communication frame included in the communication stream according to the group allocation method, and decides to, when the delay is not allowed, allocate the time slot to the communication frame included in the communication stream according to a frame allocation method for allocating the time slot in a unit of communication frame. A schedule calculation unit (104) performs calculation to allocate the time slot to the communication frame included in the communication stream according to
(Continued)

the allocation method decided by the schedule policy decision unit (103).

7 Claims, 8 Drawing Sheets

(56) References Cited

U.S. PATENT DOCUMENTS

| | | | |
|---|---|---|---|
| 5,832,380 | A | 11/1998 | Ray et al. |
| 5,878,345 | A | 3/1999 | Ray et al. |
| 5,878,346 | A | 3/1999 | Ray et al. |
| 5,884,166 | A | 3/1999 | Ray et al. |
| 5,960,343 | A | 9/1999 | Ray et al. |
| 6,108,539 | A | 8/2000 | Ray et al. |
| 6,377,802 | B1 | 4/2002 | McKenna et al. |
| 6,408,180 | B1 | 6/2002 | McKenna et al. |
| 6,788,935 | B1 | 9/2004 | McKenna et al. |
| 2002/0013150 | A1 | 1/2002 | McKenna et al. |
| 2002/0197990 | A1 | 12/2002 | Jochim et al. |
| 2003/0008652 | A1 | 1/2003 | Jochim et al. |
| 2004/0142658 | A1 | 7/2004 | McKenna et al. |
| 2004/0147243 | A1 | 7/2004 | McKenna |
| 2006/0030311 | A1 | 2/2006 | Cruz et al. |
| 2006/0040660 | A1 | 2/2006 | Cruz et al. |
| 2006/0276127 | A1 | 12/2006 | Cruz et al. |
| 2007/0021117 | A1 | 1/2007 | Mckenna et al. |
| 2008/0102812 | A1 | 5/2008 | Chari et al. |
| 2008/0130539 | A1 | 6/2008 | Lauer et al. |
| 2008/0132212 | A1 | 6/2008 | Lemond et al. |
| 2008/0133705 | A1 | 6/2008 | Lemond et al. |
| 2008/0141314 | A1 | 6/2008 | Lemond et al. |
| 2008/0181169 | A1 | 7/2008 | Lauer et al. |
| 2008/0182573 | A1 | 7/2008 | Lauer et al. |
| 2008/0274734 | A1 | 11/2008 | Kostanic et al. |
| 2008/0305762 | A1 | 12/2008 | Malosh |
| 2009/0010200 | A1 | 1/2009 | Lauer et al. |
| 2009/0197596 | A1 | 8/2009 | Wahler et al. |
| 2011/0116373 | A1 | 5/2011 | Lauer |
| 2011/0263199 | A1 | 10/2011 | Cruz et al. |
| 2011/0268096 | A1 | 11/2011 | Lauer |
| 2011/0286331 | A1 | 11/2011 | Lauer |
| 2011/0319049 | A1 | 12/2011 | Malosh |
| 2011/0320576 | A1 | 12/2011 | Lauer et al. |
| 2014/0334379 | A1 | 11/2014 | Lauer et al. |
| 2017/0331748 | A1 | 11/2017 | Mangin |
| 2018/0019803 | A1 | 1/2018 | Lauer et al. |
| 2018/0069790 | A1 | 3/2018 | Mitsumori |

FOREIGN PATENT DOCUMENTS

| | | |
|---|---|---|
| JP | 2018-42108 A | 3/2018 |
| JP | 2019-33392 A | 2/2019 |

OTHER PUBLICATIONS

International Search Report issued in PCT/JP2022/020278, issued on Jul. 19, 2022.

Extended European Search Report for European Application No. 22941742.3, dated Apr. 9, 2025.

Hellmanns et al., "On the Peformance of Stream-based, Class-based Time-aware Shaping and Frame Preemption in TSN," 2020 IEEE International Conference on Industrial Technology (ICIT), IEEE, Feb. 26, 2020, pp. 298-303.

COMMUNICATION CONTROL APPARATUS, COMMUNICATION CONTROL METHOD, AND COMPUTER READABLE MEDIUM

CROSS REFERENCE TO RELATED APPLICATIONS

This application is a Continuation of PCT International Application No. PCT/JP2022/020278, filed on May 13, 2022, all of which is hereby expressly incorporated by reference into the present application.

TECHNICAL FIELD

The present disclosure relates to a communication control technique.

BACKGROUND ART

IEEE802.1Q-2018 defines a Time Aware Shaper (TAS). The TAS is a mechanism for transferring in an Ethernet (registered trademark) network in a time-division manner, communication frames (hereinafter, also simply referred to as frames) each of which is at a different priority level.

A switch conforming to the TAS maintains a gate for each queue of a transmission port. At the gate, the transmission of a frame or the suspension of the transmission is performed. When the gate is Open, the frame is transmitted. On the other hand, when the gate is Close, the transmission of the frame is suspended.

A controller connected to the network calculates opening and closing timings of the gate for each queue. The controller sets a calculation result (a schedule) to each switch. By setting the calculation result to each switch, the controller can limit the flow rate of a frame at each priority level, and can control an End-to-End delay.

Conventional scheduling methods are broadly classified into two types which are Stream-Based (SB) and Class-Based (CB) (for example, Non-Patent Literature 1).

The SB is a method of securing an Open time (hereinafter, the Open time is referred to as a time slot) of the gate in a unit of frame. On the other hand, the CB is a method of securing the time slot in a unit of group of frames having the same priority levels. Specifically, the CB is a method of securing the time slot in a unit of class of queues.

In general, the number of constraint conditions for generating the schedule is greater in the SB than in the CB, and precise scheduling in the unit of frame is implemented in the SB. Further, a queuing delay can be theoretically controlled to 0 in the SB. Therefore, the SB has higher delay guarantee performance for an End-to-End communication stream (hereinafter, simply also referred to as a stream), compared to that of the CB.

In the CB, the time slot is set only once for each class within a cycle time. Therefore, in the CB, resources (a memory of a computer and an arithmetic operation time) necessary for scheduling do not depend on the scale of the network, and fewer resources are necessary for the scheduling, compared to those in the SB.

FIG. 7 illustrates an example of the SB scheduling. Further, FIG. 8 illustrates an example of the CB scheduling.

CITATION LIST

Non-Patent Literature

Non-Patent Literature 1: D. Hellmanns, J. Falk, A. Glavackij, R. Hummen, S. Kehrer and F. Durr, "On the Performance of Stream-based, Class-based Time-aware Shaping and Frame Preemption in TSN," 2020 IEEE International Conference on Industrial Technology (ICIT), 2020, pp. 298-303, doi: 10.1109/ICIT45562.2020.9067122.

SUMMARY OF INVENTION

Technical Problem

The SB scheduling is an NP-hard problem. Further, the SB requires many resources for the scheduling as the scale of the network increases. Further, another problem is that the number of time slots is generally greater than that of CB.

Further, in the CB scheduling, transmission requests may be issued in a time slot for a plurality of frames which belong to different streams. Therefore, a queuing delay may occur in the CB scheduling. Therefore, the CB has the problem of lower delay guarantee performance in the End-to-End stream, compared to that of the SB.

Furthermore, a decision whether the SB is necessary or the CB is sufficient for a certain stream is made depending on network configurations such as characteristics (a transmission cycle, a priority level, and the like) of the stream and requirements (an End-to-End allowable delay and the like). Therefore, it is difficult to selectively use the SB and the CB appropriately for each stream. That is, the problem is that it is difficult to apply to a single network, scheduling having the SB and the CB combined.

Further, failing to selectively use the SB and the CB appropriately, for example, using the SB excessively, arises a problem of consuming too much resource and generating more time slots than necessary.

One of main purposes of the present disclosure is to solve problems such as above. More specifically, the present disclosure mainly aims to decide to a communication stream, an appropriate method for allocating a time slot.

Solution to Problem

A communication control apparatus according to the present disclosure includes:

- an allocation method decision unit to determine whether or not a delay is allowed which is estimated to occur when a group allocation method is applied to a communication frame included in a communication stream, wherein the group allocation method is for allocating a time slot for transmitting a communication frame in a unit of group of one or more communication frames having a common attribute, to decide, when the delay is allowed, to allocate the time slot to the communication frame included in the communication stream according to the group allocation method, and to decide, when the delay is not allowed, to allocate the time slot to the communication frame included in the communication stream according to a frame allocation method for allocating the time slot in a unit of communication frame; and
- a time slot allocation unit to perform calculation to allocate the time slot to the communication frame included in the communication stream according to the allocation method decided by the allocation method decision unit.

Advantageous Effects of Invention

According to the present disclosure, it is possible to decide to a communication stream, an appropriate method for allocating a time slot.

DESCRIPTION OF EMBODIMENTS

Embodiments will be described hereinafter with reference to the drawings. In the following description of the embodiments and the drawings, portions denoted by the same reference signs indicate the same or corresponding portions.

Embodiment 1

In the present embodiment, a configuration will be described in which an appropriate method for allocating a time slot is decided to each communication stream accommodated in a network.

More specifically, the present embodiment deices to each communication stream, either of a method (a frame allocation method) for allocating the time slot in a unit of communication frame and a method (a group allocation method) for allocating the time slot in a unit of group of one or more communication frames that have common attributes.

In the present embodiment, the description will be continued using the SB as a specific example of the frame allocation method and using the CB as a specific example of the group allocation method.

*Description of Configuration*

Figure 1:
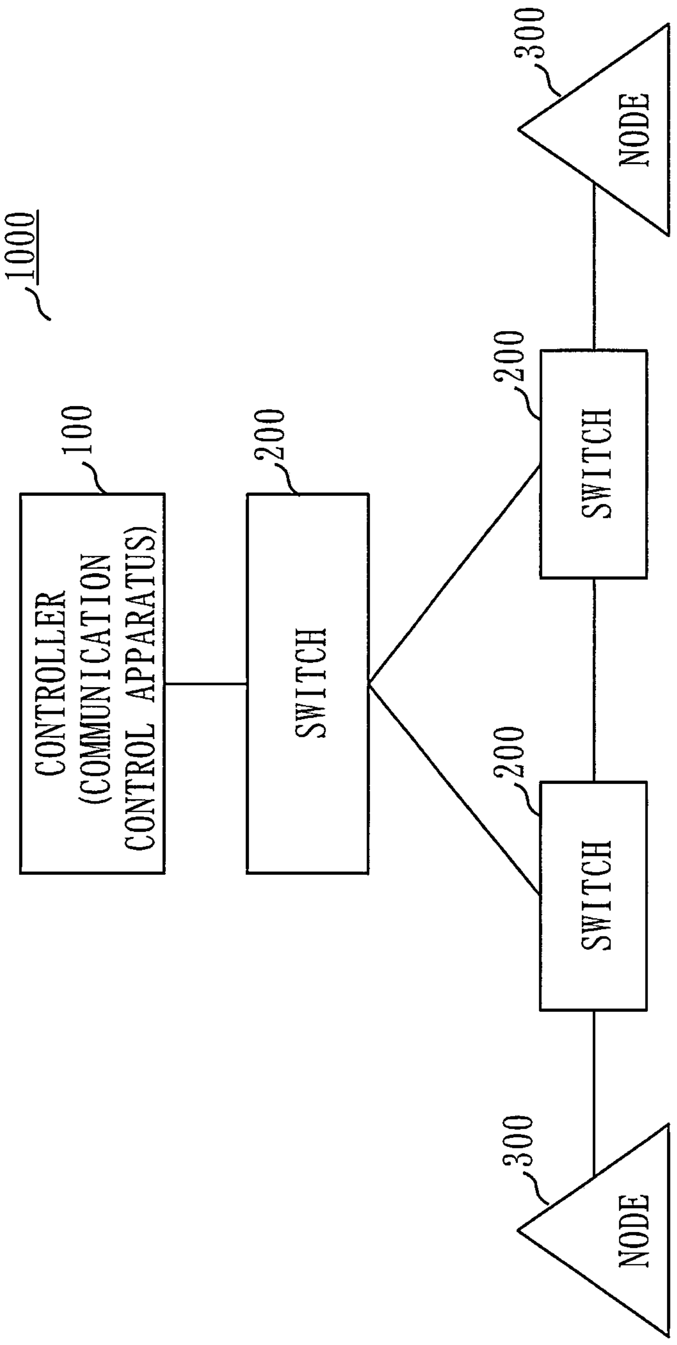
FIG. 1 is a diagram illustrating a configuration example of a network according to Embodiment 1.

FIG. 1 illustrates a configuration example of a network 1000 according to the present embodiment.

The network 1000 according to the present embodiment is configured with one controller 100, three switches 200, and two nodes 300. The configuration of the network 1000 illustrated in FIG. 1 is an example, and the number of controller 100, the number of switches 200, and the number of nodes 300 are not limited to the numbers illustrated in FIG. 1. Further, connection relations between the controller 100, the switches 200, and the nodes 300 are not limited to the example illustrated in FIG. 1.

In the present embodiment, a plurality of communication frames that belongs to a plurality of communication streams is transmitted and received between the node 300 and the node 300 via one or more switches 200.

The controller 100 decides to each communication stream, the allocation method of the time slot, and calculates a schedule. Further, the controller 100 sets the schedule obtained by the calculation to each of the switches 200.

The controller 100 is equivalent to a communication control apparatus. An operational procedure of the controller 100 is equivalent to a communication control method. Further, a program that implements operation of the controller 100 is equivalent to a communication control program.

The switch 200 is a transfer device that transfers a communication frame. The communication frame is, for example, an Ethernet (registered trademark) frame.

The node 300 transmits and receives the plurality of communication frames that belongs to the plurality of communication streams, via the switches 200.

Figure 2:
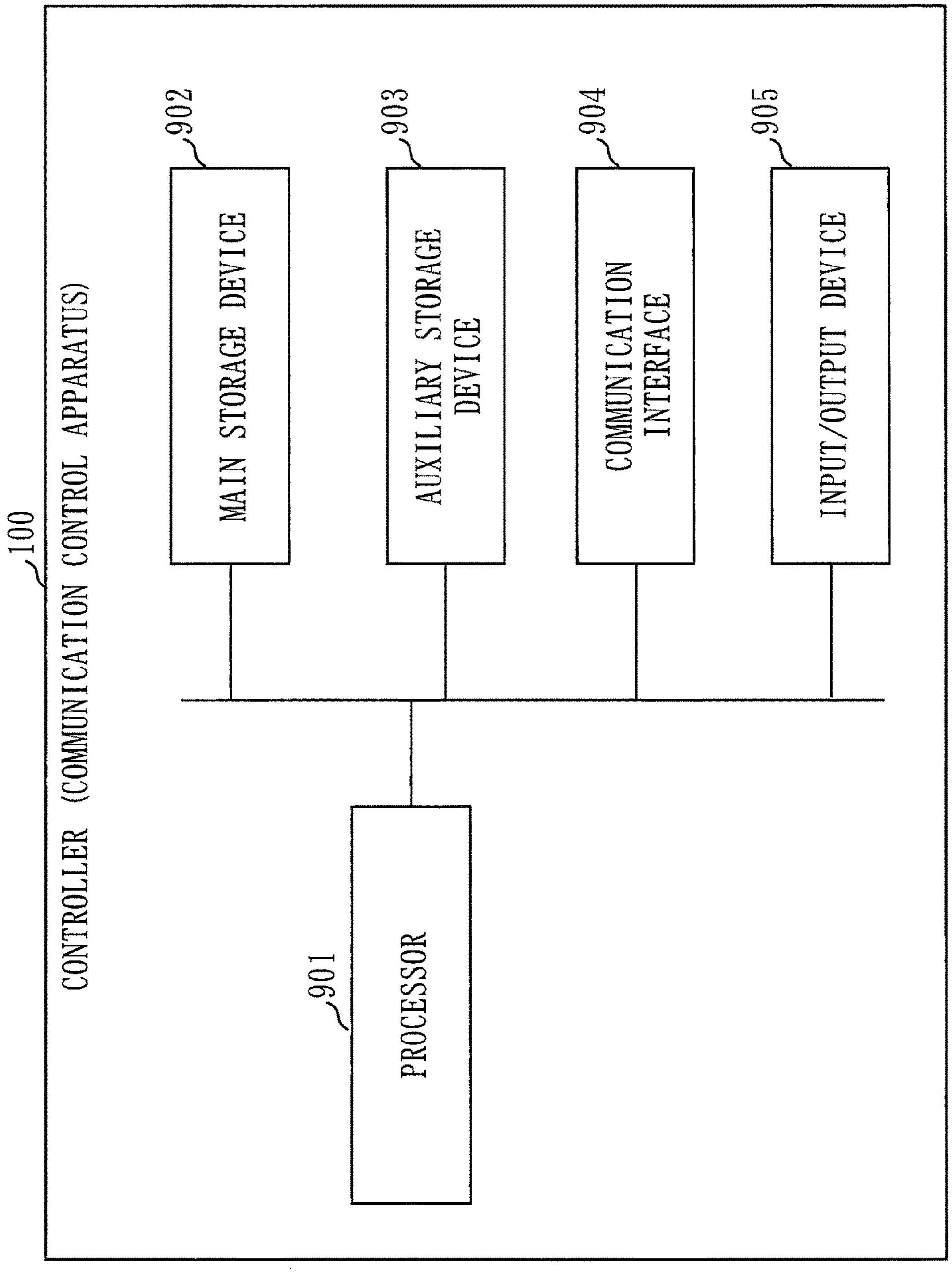
FIG. 2 is a diagram illustrating a hardware configuration example of a controller according to Embodiment 1.

FIG. 2 illustrates a hardware configuration example of the controller 100 according to the present embodiment.

The controller 100 according to the present embodiment is a computer.

The controller 100 includes a processor 901, a main storage device 902, an auxiliary storage device 903, a communication interface 904, and an input/output device 905, as pieces of hardware.

The auxiliary storage device 903 stores programs that implement functions of a network information acquisition unit 101, a network information processing unit 102, a schedule policy decision unit 103, a schedule calculation unit 104, and a schedule result output unit 105 to be described below.

These programs are loaded from the auxiliary storage device 903 into the main storage device 902. Then, the processor 901 executes these programs and performs operation of the network information acquisition unit 101, the network information processing unit 102, the schedule policy decision unit 103, the schedule calculation unit 104, and the schedule result output unit 105 to be described below.

Further, the processor 901 performs writing and reading of values of various variable values used in the schedule calculation to and from the main storage device 902.

The communication interface 904 transmits to each of the switches 200, the schedule obtained by the calculation.

The input/output device 905 receives input of network information to be described below. Further, the input/output device 905 outputs the schedule. When a result of "no solution exists" to be described below is obtained, the input/output device 905 outputs a message that notifies of the result of "no solution exists".

Figure 3:
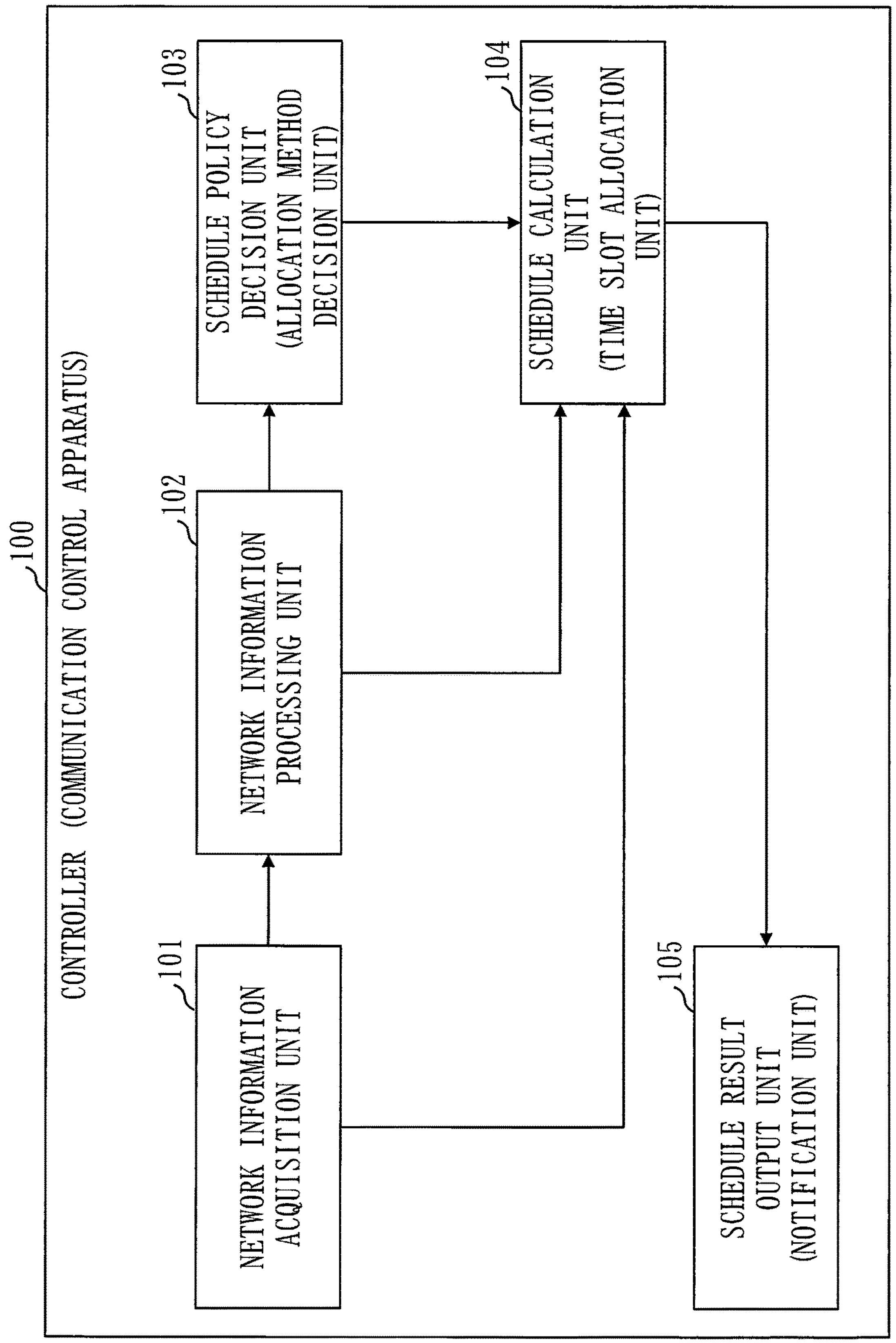
FIG. 3 is a diagram illustrating a functional configuration example of the controller according to Embodiment 1.

FIG. 3 illustrates a functional configuration example of the controller 100 according to the present embodiment.

The network information acquisition unit 101 acquires network information.

Details of the network information will be described below.

The network information processing unit 102 generates parameters necessary for the schedule calculation.

The schedule policy decision unit 103 decides to each communication stream, a method for allocating the time slot. The time slot is, as described above, an Open time at a gate in the switch 200. That is, the time slot is a time for transmitting a communication frame.

The schedule policy decision unit 103 decides to each communication stream, according to which of the SB (the frame allocation method) or the CB (the group allocation method) the time slot is allocated to the communication frame.

More specifically, the schedule policy decision unit 103 determines for each communication stream, whether a delay that is estimated to occur when the CB is applied to the communication frame included in the communication stream is allowed or not. Then, when the delay is allowed, the schedule policy decision unit 103 decides to allocate the time slot according to the CB. On the other hand, when the delay is not allowed, the schedule policy decision unit 103 decides to allocate the time slot according to the SB.

The schedule policy decision unit 103 is equivalent to an allocation method decision unit. Further, a process performed by the schedule policy decision unit 103 is equivalent to an allocation method decision process.

The schedule calculation unit 104 performs calculation (calculates the schedule) to allocate the time slot to the communication frame included in each communication frame according to the allocation method decided by the schedule policy decision unit 103.

The schedule calculation unit 104 is equivalent to a time slot allocation unit. Further, a process performed by the schedule calculation unit 104 is equivalent to a time slot allocation process.

The schedule result output unit 105 outputs to the input/output device 905, a schedule result by the schedule calculation unit 104. Further, when the result of "no solution exists" to be described below is obtained, the schedule result output unit 105 outputs to the input/output device 905, a message that notifies of the result of "no solution exists".

The schedule result output unit 105 is equivalent to a notification unit.

*Description of Operation*

Next, an operational example of the controller 100 according to the present embodiment will be described.

Figure 4:
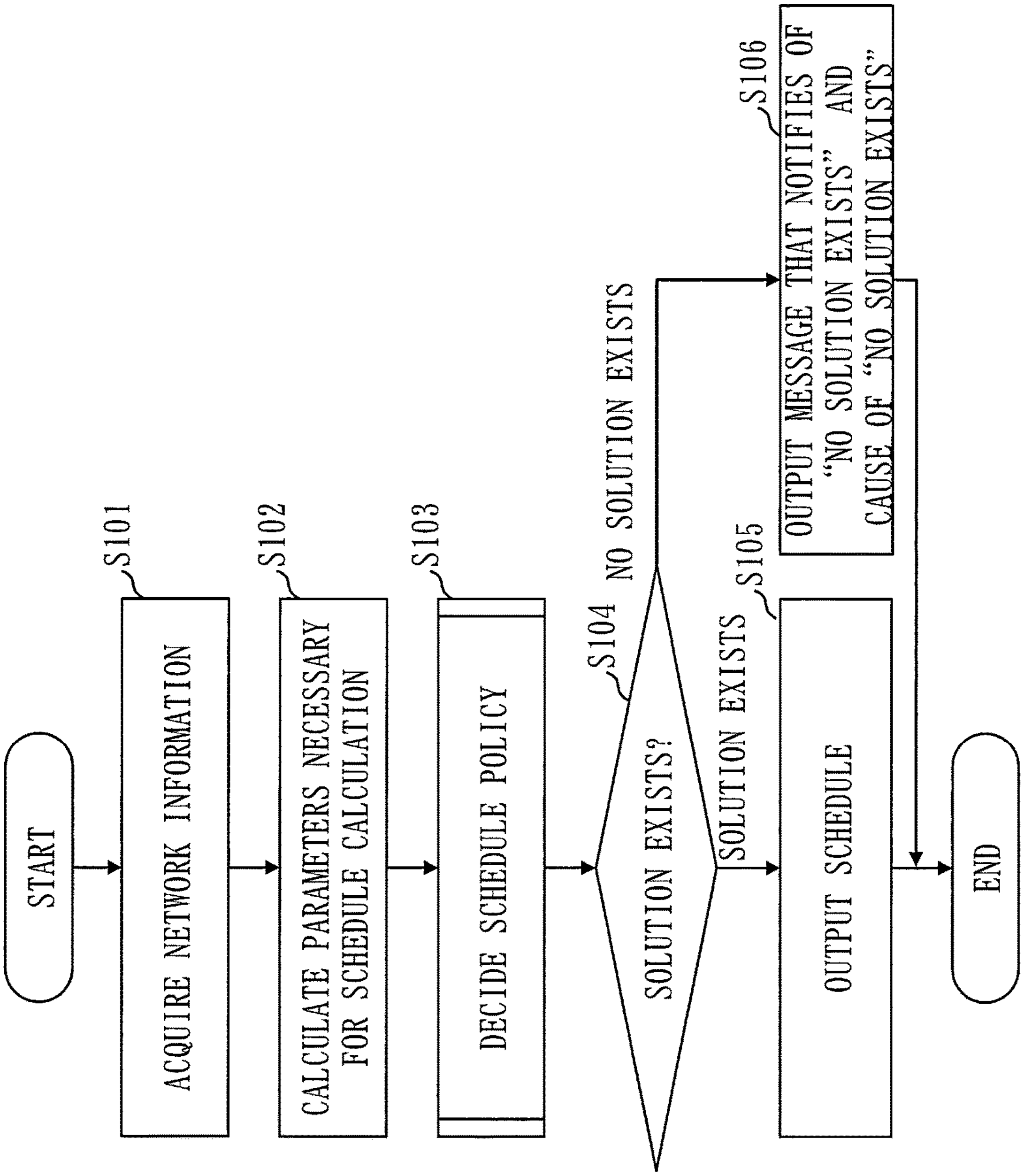
FIG. 4 is a flowchart illustrating an operational example of the controller according to Embodiment 1.

Here, the operational example of the controller 100 from acquiring the network information to outputting a schedule result will be described with reference to FIG. 4.

First, in step S101, the network information acquisition unit 101 acquires the network information. The network information acquisition unit 101 outputs the acquired network information to the network information processing unit 102 and the schedule calculation unit 104.

Here, the network information includes the following information.

1) Topology information
2) Link speed information
3) Stream information

The topology information indicates the topology of the network 1000. That is, the topology information indicates connection relations between devices included in the network 1000.

Specifically, the topology information indicates which node 300 is connected to which switch 200, and which switch 200 is connected to which switch 200.

The link speed information indicates a communication speed of a link, for each link included in the network 1000.

Specifically, the link speed information indicates the communication speed of each of a link between a node and a switch and a link between a switch and a switch.

The stream information is information on a communication stream. The stream information indicates a transmission source node, a transmission destination node, a communication path, a transmission cycle, a priority level, an End-to-End allowable delay, and the like, for each communication stream.

The transmission source node is the node 300 at a transmission source of the communication frame.

The transmission destination node is the node 300 at a transmission destination of the communication frame.

The communication path is a relay path of the communication frame between the transmission source node and the transmission destination node.

The transmission cycle is a cycle at which the transmission source node transmits the communication frame.

The priority level is a priority level set to the communication frame.

The End-to-End allowable delay is an allowable value of a delay time for the communication frame transmitted from the transmission source node to arrive at the transmission destination node.

Next, in step S102, the network information processing unit 102 generates from the network information, parameters necessary for the schedule calculation.

The parameters necessary for the schedule calculation include a frame transmission time, a cycle time (AdminCycleTime defined in IEEE 802.1Q-2018), and the like, of each communication stream.

The cycle time is calculated by, for example, the least common multiple or the greatest common divisor of the transmission cycle of a stream accommodated in the network.

The network information processing unit 102 notifies the schedule policy decision unit 103 and the schedule calculation unit 104 of the generated parameters.

Next, in step S103, the schedule policy decision unit 103 decides to each communication stream, the allocation method of the time slot. That is, the schedule policy decision unit 103 decides to each communication stream, whether the time slot is allocated to a communication frame included in the communication stream according to the SB or according to the CB. The allocation method (the SB or the CB) of the time slot for each communication frame decided by the schedule policy decision unit 103 is referred to as a schedule policy for each communication stream.

Further, the schedule policy decision unit 103 decides the number of classes to be used in the SB and the number of classes to be used in the CB.

The schedule policy decision unit 103 notifies the schedule calculation unit 104 of the schedule policy for each communication stream, the number of classes to be used in the SB, and the number of classes to be used in the CB.

Figure 5:
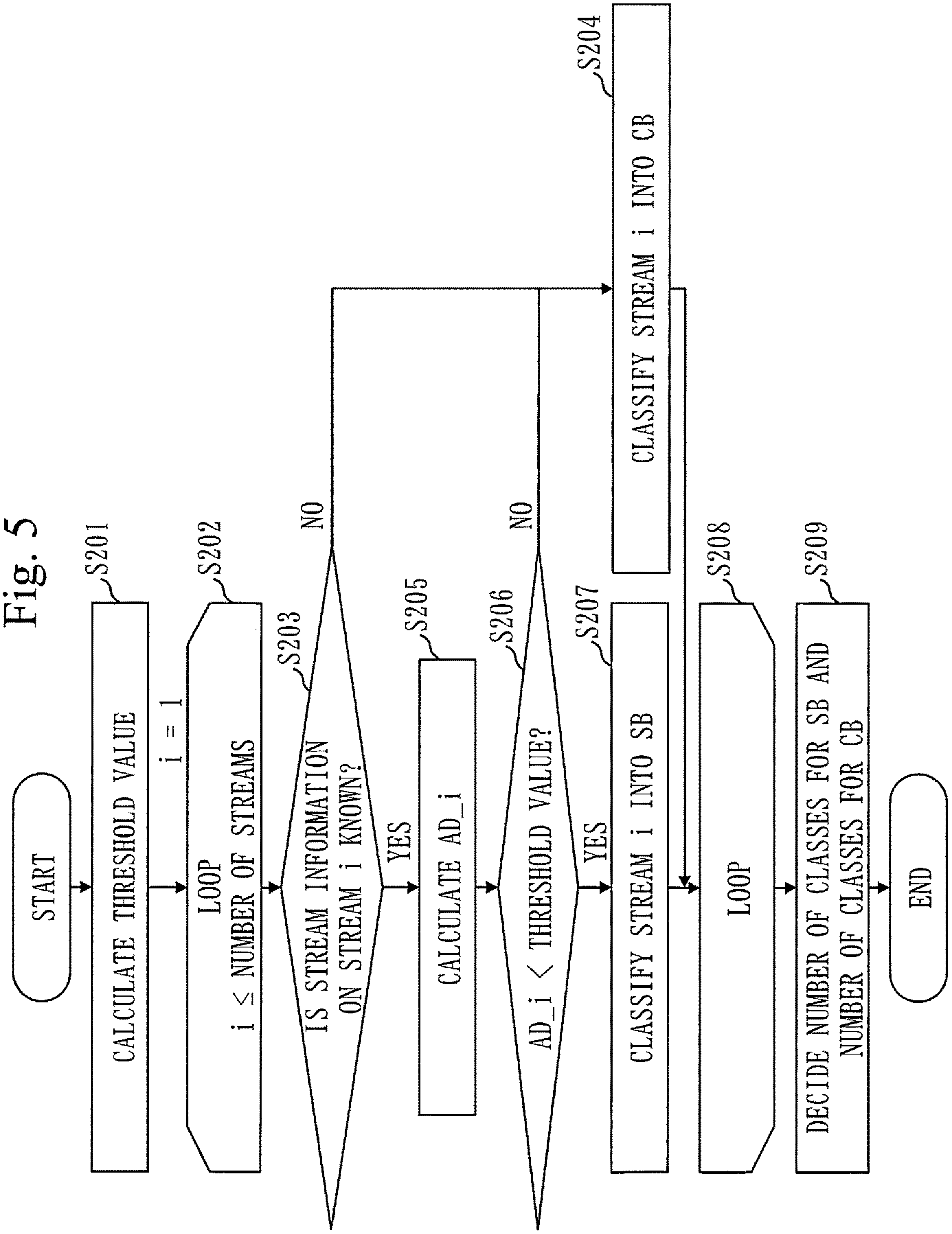
FIG. 5 is a flowchart illustrating details of a schedule policy decision process according to Embodiment 1.

Details of step S103 will be described below with reference to FIG. 5.

Next, in step S104, the schedule calculation unit 104 generates constraint conditions of the schedule based on the following information. Further, the schedule calculation unit 104 calculates a solution (=a schedule) that satisfies all of the constraint conditions.

1) The network information acquired from the network information acquisition unit 101
2) The parameters acquired from the network information processing unit 102
3) The schedule policy (the SB or the CB) for each communication stream acquired from the schedule policy decision unit 103
4) The number of classes to be used in the SB and the number of classes to be used in the CB acquired from the schedule policy decision unit 103

The constraint conditions includes a constraint condition that is common to the SB and the CB, and a constraint condition that is different between the SB and the CB.

As the constraint condition common to the SB and the CB, there is a constraint condition that an End-to-End delay that occurs when a communication frame is transferred according to the schedule obtained by the calculation must not exceed an End-to-End allowable delay of the corresponding communication stream, for example.

Each of a constraint condition specific to the SB and a constraint condition specific to the CB can be arbitrarily set by an administrator of the network 1000 according to the operational policy of the network 1000.

Since the SB is decided as the schedule policy for a communication stream whose allowable delay is severe, the SB is set to a high priority class and the CB is set to a low priority class.

Figure 6:
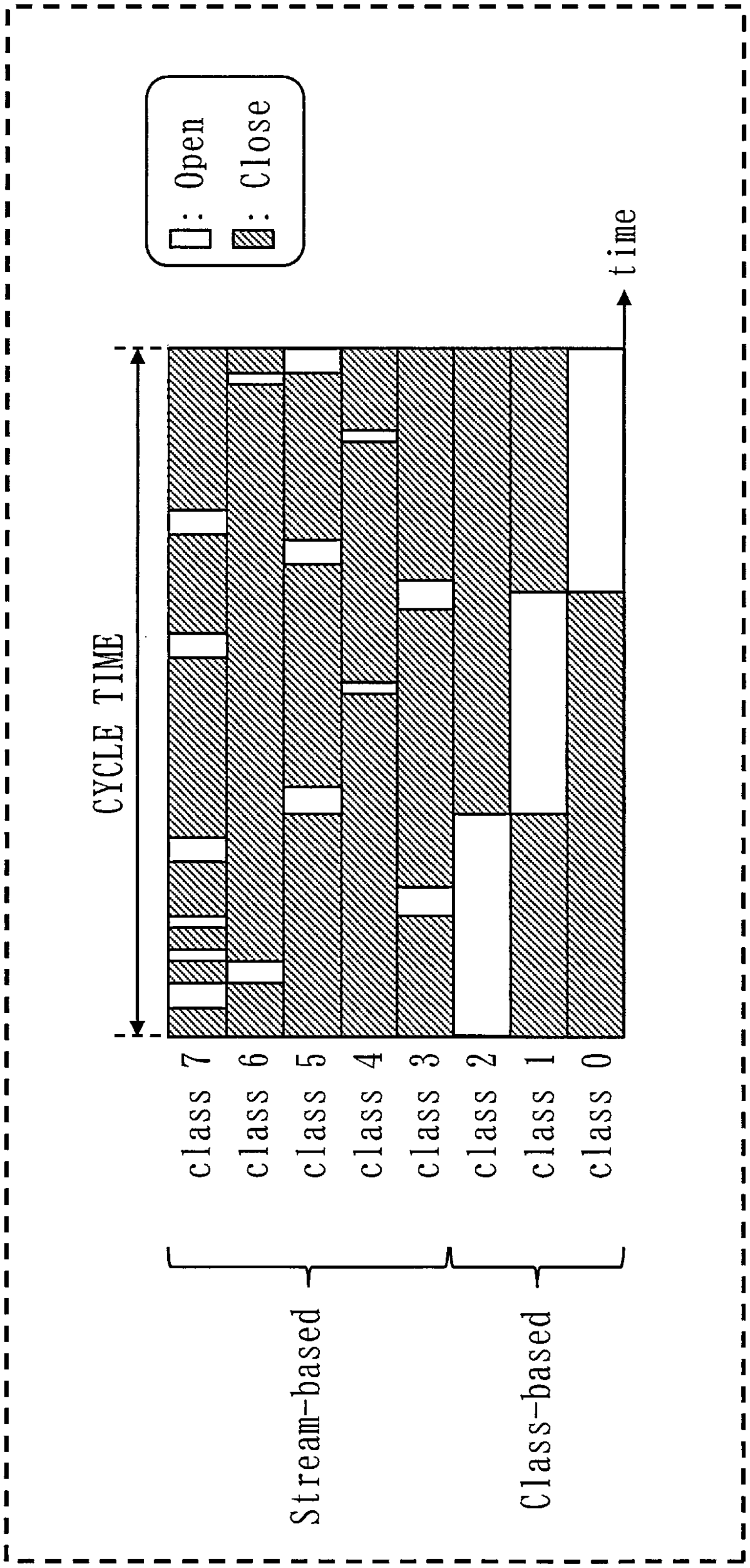
FIG. 6 is a diagram illustrating an example of scheduling according to Embodiment 1.
Figure 7:
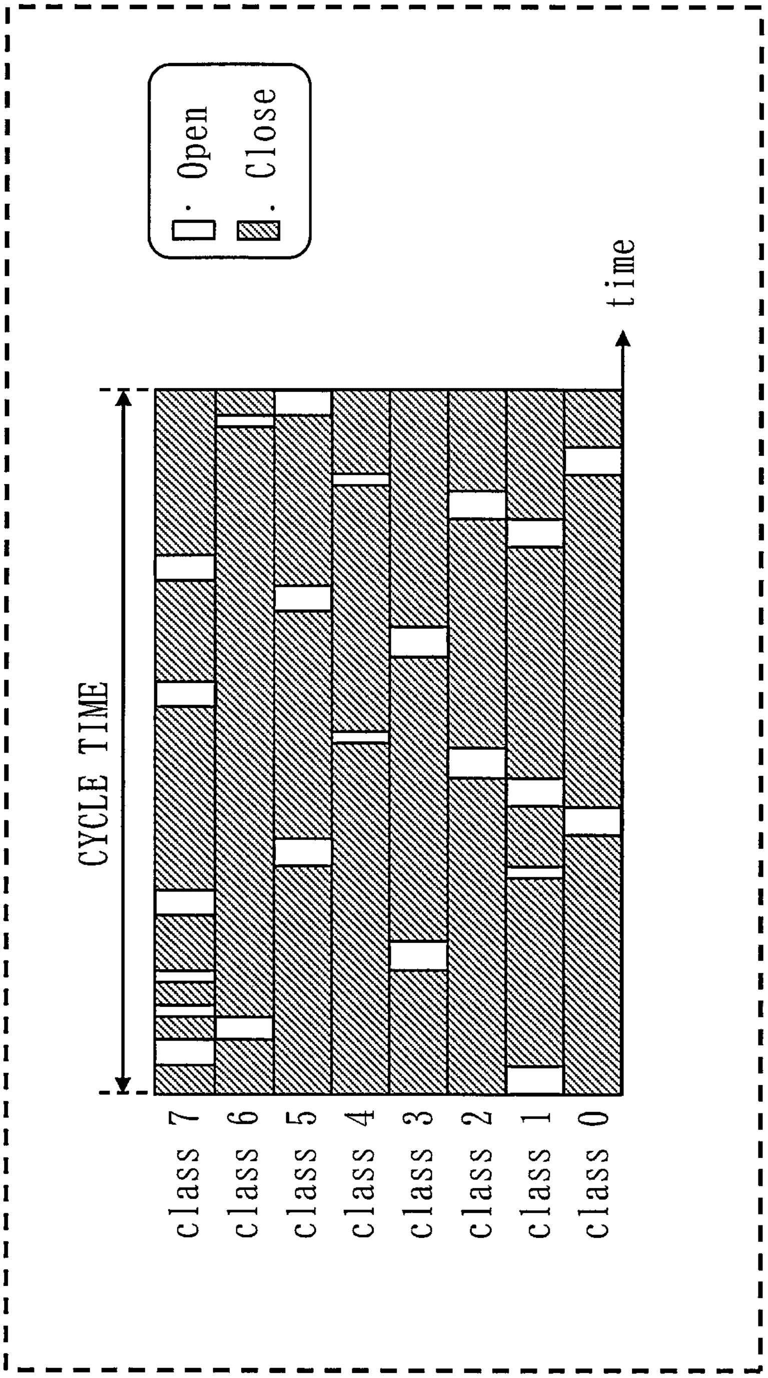
FIG. 7 is a diagram illustrating an example of SB scheduling.
Figure 8:
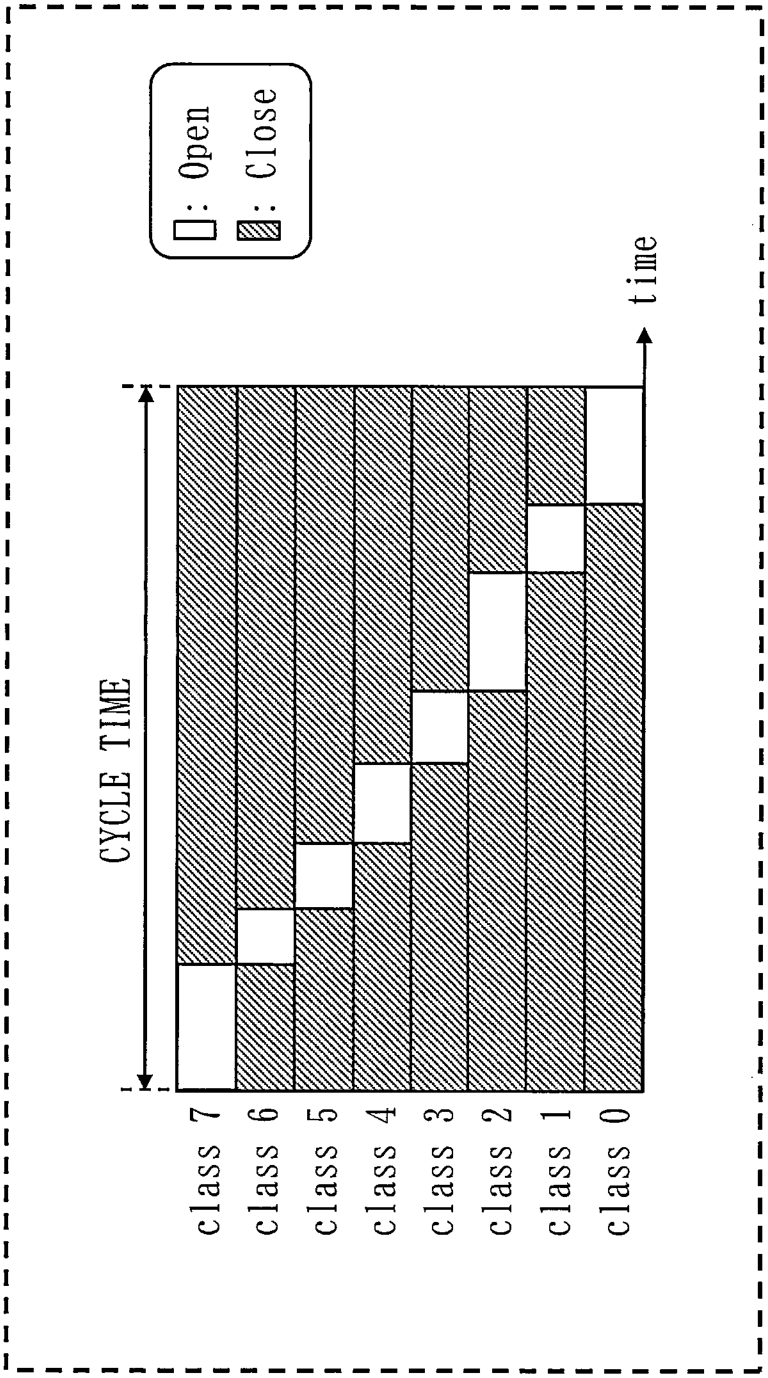
FIG. 8 is a diagram illustrating an example of CB scheduling.

FIG. 6 illustrates an example of the schedule obtained by the schedule calculation unit 104.

In the example of FIG. 6, the number of classes to be used in the SB is 5 and the number of classes to be used in the CB is 3.

The schedule calculation unit 104 may generate the schedule common to all of the switches 200 or may generate the schedule for each of the switches 200, depending on the stream information.

In a case of "solution exists" in step S104, the process of step S105 is performed. The "solution exists" case is a case where the schedule that satisfies all of the constraint conditions is generated. That is, the "solution exists" case is a case where the result (the allocation result) of allocating the time slot to the communication frame of each communication stream according to the schedule policy satisfies the constraint conditions.

In the case of "solution exists", the schedule result output unit 105 outputs the schedule in step S105.

The schedule result output unit 105 may output the schedule to the input/output device 905, or may output the schedule to the communication interface 904. When the schedule result output unit 105 outputs the schedule to the input/output device 905, the schedule can be presented to the administrator of the network 1000 who operates the controller 100. Further, when the schedule result output unit 105 outputs the schedule to the communication interface 904, the schedule is transmitted from the communication interface 904 to each of the switches 200.

On the other hand, in a case of "no solution exists" in step S104, the process of step S106 is performed. The "no solution exists" case is a case where the schedule that satisfies all of the constraint conditions cannot be generated. That is, the "no solution exists" case is a case where the result (the allocation result) of allocating the time slot to the communication frame of each communication stream according to the schedule policy does not satisfy the constraint conditions.

In the case of "no solution exists", the schedule result output unit 105 outputs in step S106, a message that notifies of "no solution exists" and a cause of "no solution exists". Specifically, the schedule result output unit 105 outputs to the input/output device 905, the message that notifies of "no solution exists" and the cause of "no solution exists".

Thereby, the administrator of the network 1000 who operates the controller 100 can recognize the fact of "no solution exists" and the cause of "no solution exists".

The schedule result output unit 105 notifies of a constraint condition that is not satisfied, as the cause of "no solution exists", for example.

The administrator of the network 1000 can consider a countermeasure for obtaining the solution (=the schedule), by referring to the cause of "no solution exists" notified by the schedule result output unit 105. The administrator can reconsider the configuration of the network 1000, elements defined in the stream information, and a threshold value calculation method (step S201) to be described below, as the countermeasure for obtaining the solution, for example. The elements defined in the stream information are, as described above, the transmission source node, the transmission destination node, the communication path, the transmission cycle, the priority level, the End-to-End allowable delay, and the like.

Further, the schedule result output unit 105 may notify of the countermeasure for obtaining the solution, in addition to the cause of "no solution exists". That is, the schedule result output unit 105 may notify of the countermeasure that enables the allocation result of the time slot to satisfy the constraint conditions. The schedule result output unit 105 notifies of, for example, a modification proposal for the configuration of the network 1000, a modification proposal for the elements defined in the stream information, a modification proposal for the threshold value calculation method (step S201), and the like, as the countermeasure for obtaining the solution.

Next, details of step S103 (a schedule policy decision process) of FIG. 4 will be described with reference to FIG. 5.

First, in step S201, the schedule policy decision unit 103 calculates a threshold value.

The threshold value obtained in step S201 is a value to be compared with AD_i to be described below.

The schedule policy decision unit 103 calculates one value that is applied throughout the network 1000, as the threshold value. The schedule policy decision unit 103 can obtain the threshold value by dividing the cycle time obtained in step S102 by the number of classes of transmission queues to be used in each of the switches 200, for example. When the cycle time is 80 ms and the number of classes is 8, the schedule policy decision unit 103 obtains 10 ms as the threshold value, for example.

Steps S202 to S208 is a loop process performed for each stream.

Here, "i" is a variable value for counting the number of streams. The value of "i" is incremented each time when the loop process of steps S202 to S208 ends. When the value of "i" reaches the number of streams that are in the network 1000, the loop process is completed.

In step S203, the schedule policy decision unit 103 determines whether or not the stream information on a stream i is known.

"The stream information is known" means that the stream information includes information necessary for calculation of AD_i. When the stream information does not include the information necessary for the calculation of AD_i, the schedule policy decision unit 103 determines that the stream information is not known. Further, when the stream information on the stream i has not been obtained, the schedule policy decision unit 103 determines that the stream information is not known.

When the stream information on the stream i is not known (NO in step S203), the process proceeds to step S204.

In step S204, the schedule policy decision unit 103 classifies the stream i into the CB.

That is, the schedule policy decision unit 103 determines that the time slot of the communication frame included in the stream i is allocated according to the CB.

On the other hand, when the stream information on the stream i is known (YES in step S203), the process proceeds to step S205.

In step S205, the schedule policy decision unit 103 calculates AD_i for the stream i.

AD_i is an index value of a queuing delay allowed on the stream i. The queuing delay is a delay that occurs due to queuing in one of the switches 200, and strictly speaking, is a time during which a frame remains in a queue because the gate is Close or another fame is transmitted earlier even if the gate is Open. Here, a specific example of AD_i (the index vlaue) will be described with reference to FIG. 1. In the network of FIG. 1, communication is considered that passes through the switches on the bottom left and bottom right (that does not pass through the switch directly connected the controller), assuming that the node on the left side as the transmission source of the stream i and the node on the right side as the transmission destination of the stream i. At this time, the communication path is the transmission source node→the bottom left switch→bottom right switch→the transmission destination node. If the End-to-End allowable delay of the stream i is 10 ms and the End-to-End delay in a case where no queuing delay occurs at the two switches on the communication path is 2 ms, an allowable sum of the queuing delay at the two switches is 8 ms. 4 ms is set to AD_i, as a value (an index value) serving as a reference for an allowable queuing delay at one switch, where 4 ms is obtained by dividing 8 ms which is the upper limit of the allowable sum of the queuing delay by the number of switches where the communication passes through, i.e. 2. Since it is allowable if the sum is within 8 ms, scheduling with 3 ms as a queuing delay at the bottom left switch and 5 ms as a queuing delay at the bottom right switch is obviously adequate, for example. However, for a stream where queuing delay is expected to exceed the above index value due to the CB scheduling, the present embodiment factors in determining that satisfying the End-to-End allowable delay is hard, and reducing the number of scheduling failures and the number of schedule recalculations by allocating the SB scheduling.

Further. AD_i may be an index value of a fluctuation in a queuing delay allowed on the stream i.

The fluctuation in the queuing delay is a difference between a maximum delay time in the queuing delay and a minimum delay time in the queuing delay. When the End-to-End allowable delay is set to the stream i, AD_i may be an index value of the queuing delay allowed on the stream i, and when the End-to-End allowable delay fluctuation is set to the stream i, AD_i may be an index value of the fluctuation in the queuing delay allowed on the stream i.

The schedule policy decision unit 103 calculates AD_i, using parameters such as the number of hops of the stream i, a transmission cycle, an End-to-End allowable delay, and an End-to-End allowable delay fluctuation. Specifically, as described in the description of the specific example of AD_i, AD_i is a value obtained by dividing by the number of hops of the stream i, a time obtained by subtracting from the End-to-End allowable delay, the End-to-End delay in the case where no queuing delay occurs at all of the switches on the communication path. The End-to-End allowable delay in the present calculation formula may be replaced with the transmission cycle of the stream i, or the End-to-End allowable delay fluctuation.

The number of hops of the stream i is the number of switches through which a communication frame included in the stream i is transferred from the node 300 at the transmission source to the node 300 at the transmission destination.

The transmission cycle is a transmission cycle of a communication frame in the node 300 at the transmission source of the communication frame included in the stream i.

The End-to-End allowable delay is an allowable value for a delay time of a communication frame included in the stream i, from the node 300 at the transmission source to the node 300 at the transmission destination.

The End-to-End allowable delay fluctuation is an allowable value for a fluctuation in a delay time of a communication frame included in the stream i, from the node 300 at the transmission source to the node 300 at the transmission destination. The fluctuation in the delay time is a difference between a maximum delay time and a minimum delay time.

Next, in step S206, the schedule policy decision unit 103 compares the threshold value obtained in step S201 to AD_i obtained in S205.

When AD_i is less than the threshold value (YES in step S206), the process proceeds to step S207.

On the other hand, when AD_i is equal to or greater than the threshold value (NO in step S206), the process proceeds to step S204.

In step S207, since it is likely that the CB does not satisfy the allowable delay, the schedule policy decision unit 103 classifies the stream i into the SB.

That is, the schedule policy decision unit 103 determines that a delay (a delay at one of the switches 200) estimated to occur when the CB is applied to the stream i is not allowed, and decides that the time slot of the communication frame included in the stream i is allocated according to the SB.

In such a manner, the schedule policy decision unit 103 determines whether or not the delay estimated to occur when the CB is applied is allowed in the stream i, by comparing AD_i to the threshold value.

On the other hand, in step S204, since it is likely that the CB satisfies the allowable delay, the schedule policy decision unit 103 classifies the stream i into the CB.

That is, the schedule policy decision unit 103 determines that a delay (a delay at one of the switches 200) estimated to occur when the CB is applied to the stream i is allowed, and decides that the time slot of the communication frame included in the stream i is allocated according to the CB.

Finally, in step S209, the schedule policy decision unit 103 decides each of the number of classes for the SB and the number of classes for the CB in such a way that the sum of the number of classes for the SB and the number of classes for the CB is equal to the number of classes of transmission queues used at each of the switches 200. The schedule policy decision unit 103 can flexibly modify the decision procedure of the number of classes depending on stream information, an object (a resource consumption amount or the like) to be optimized, or the like.

Description of Effects of Embodiment

As described above, in the present embodiment, scheduling is performed by appropriately combining the SB and the CB. Therefore, according to the present embodiment, while an allowable delay of each stream is satisfied, consumptions of resources (a memory of a computer and an arithmetic operation time) and the number of time slots to be generated can be reduced, and optimal scheduling can be realized.

The procedures described in the present embodiment are examples.

Therefore, only a part of the procedures described in the present embodiment may be implemented.

Alternatively, at least a part of the procedures described in the present embodiment and a procedure not described in the present embodiment may be implemented in combination.

Further, the configurations and procedures described in the present embodiment may be modified as necessary.

*Supplementary Description of Hardware Configuration*

Finally, a supplementary description of a hardware configuration of the controller 100 will be given.

The processor 901 illustrated in FIG. 2 is an Integrated Circuit (IC) that performs processing.

The processor 901 is a Central Processing Unit (CPU), a Digital Signal Processor (DSP), or the like.

The main storage device 902 illustrated in FIG. 2 is a Random Access Memory (RAM).

The auxiliary storage device 903 illustrated in FIG. 2 is a Read Only Memory (ROM), a flash memory, a Hard Disk Drive (HDD), or the like.

The communication interface 904 illustrated in FIG. 2 is an electronic circuit that executes a communication process for data.

The communication interface 904 is, for example, a communication chip or a Network Interface Card (NIC).

The input/output device 905 illustrated in FIG. 2 is a keyboard, a mouse, a display, or the like.

Further, the auxiliary storage device 903 also stores an Operating System (OS).

Then, at least a part of the OS is executed by the processor 901.

While executing at least the part of the OS, the processor 901 executes programs that implement functions of the network information acquisition unit 101, the network information processing unit 102, the schedule policy decision unit 103, the schedule calculation unit 104, and the schedule result output unit 105.

By the processor 901 executing the OS, task management, memory management, file management, communication control, and the like are performed.

Further, at least one of information, data, a signal value, and a variable value that indicate results of processes of the network information acquisition unit 101, the network information processing unit 102, the schedule policy decision unit 103, the schedule calculation unit 104, and the schedule result output unit 105 is stored in at least one of the main storage device 902, the auxiliary storage device 903, and a register and a cache memory in the processor 901.

Further, the programs that implement the functions of the network information acquisition unit 101, the network information processing unit 102, the schedule policy decision unit 103, the schedule calculation unit 104, and the schedule result output unit 105 may be stored in a portable recording medium such as a magnetic disk, a flexible disk, an optical disc, a compact disc, a Blu-ray (registered trademark) disc, or a DVD. Then, the portable recording medium storing the programs that implement the functions of the network information acquisition unit 101, the network information processing unit 102, the schedule policy decision unit 103, the schedule calculation unit 104, and the schedule result output unit 105 may be distributed.

Further, the "unit" of at least one of the network information acquisition unit 101, the network information processing unit 102, the schedule policy decision unit 103, the schedule calculation unit 104, and the schedule result output unit 105 may be read as a "circuit", "step", "procedure", "process", or "circuitry".

Further, the controller 100 may be implemented by a processing circuit. The processing circuit is, for example, a logic Integrated Circuit (IC), a Gate Array (GA), an Application Specific Integrated Circuit (ASIC), or a Field-Programmable Gate Array (FPGA).

In this case, each of the network information acquisition unit 101, the network information processing unit 102, the schedule policy decision unit 103, the schedule calculation unit 104, and the schedule result output unit 105 is implemented as a part of the processing circuit.

In the present description, a superordinate concept of the processor and the processing circuit is referred to as "processing circuitry".

That is, each of the processor and the processing circuit is a specific example of the "processing circuitry".

REFERENCE SIGNS LIST

100: controller; 101: network information acquisition unit; 102: network information processing unit; 103: schedule policy decision unit; 104: schedule calculation unit; 105: schedule result output unit; 200: switch; 300: node; 901: processor; 902: main storage device; 903: auxiliary storage device; 904: communication interface; 905: input/output device; 1000: network.

The invention claimed is:

1. A communication control apparatus comprising:

processing circuitry:

to determine whether or not a delay is allowed, which is estimated to occur when a group allocation method is applied to a communication frame included in a communication stream, based on a result of calculating an index value of a queuing delay allowed for the communication stream and comparing the calculated index value against a threshold value to determine the result, wherein the group allocation method is for allocating a time slot for transmitting a communication frame in a unit of group of one or more communication frames having a common attribute, to decide, when the delay is allowed, to allocate the time slot to the communication frame included in the communication stream according to the group allocation method, and to decide, when the delay is not allowed, to allocate the time slot to the communication frame included in the communication stream according to a frame allocation method for allocating the time slot in a unit of communication frame; and to perform calculation to allocate the time slot to the communication frame included in the communication stream according to the decided allocation method.

2. The communication control apparatus according to claim 1, wherein the processing circuitry decides for each communication frame of a plurality of communication frames, one of the group allocation method and the frame allocation method as the allocation method of the time slot, and performs calculation to allocate the time slot to the communication frame included in the communication stream according to the decided allocation method, for each communication stream.

3. The communication control apparatus according to claim 2, wherein when an allocation result of the time slot to the plurality of communication streams according to the decided allocation method does not satisfy a constraint condition, the processing circuitry notifies that the allocation result does not satisfy the constraint condition.

4. The communication control apparatus according to claim 3, wherein the processing circuitry notifies of a cause which causes the allocation result to fail to satisfy the constraint condition.

5. The communication control apparatus according to claim 3, wherein the processing circuitry notifies of a countermeasure which enables the allocation result to satisfy the constraint condition.

6. A communication control method comprising:

determining whether or not a delay is allowed, which is estimated to occur when a group allocation method is applied to a communication frame included in a communication stream, based on a result of calculating an index value of a queuing delay allowed for the communication stream and comparing the calculated index value against a threshold value to determine the result, wherein the group allocation method is for allocating a time slot for transmitting a communication frame in a unit of group of one or more communication frames having a common attribute, deciding, when the delay is allowed, to allocate the time slot to the communication frame included in the communication stream according to the group allocation method, and deciding, when the delay is not allowed, to allocate the time slot to the communication frame included in the communication stream according to a frame allocation method for allocating the time slot in a unit of communication frame; and performing calculation to allocate the time slot to the communication frame included in the communication stream according to the decided allocation method.

7. A non-transitory computer readable medium storing a communication control program for causing a computer to execute:

an allocation method decision process:

to determine whether or not a delay is allowed, which is estimated to occur when a group allocation method is applied to a communication frame included in a communication stream, based on a result of calculating an index value of a queuing delay allowed for the communication stream and comparing the calculated index value against a threshold value to determine the result, wherein the group allocation method is for allocating a time slot for transmitting a communication frame in a unit of group of one or more communication frames having a common attribute, to decide, when the delay is allowed, to allocate the time slot to the communication frame included in the communication stream according to the group allocation method, and to decide, when the delay is not allowed, to allocate the time slot to the communication frame included in the communication stream according to a frame allocation method for allocating the time slot in a unit of communication frame; and a time slot allocation process to perform calculation to allocate the time slot to the communication frame included in the communication stream according to the allocation method decided by the allocation method decision process.

* * * * *